United States Patent Office 3,576,698
Patented Apr. 27, 1971

3,576,698
MOLDED SYNTHETIC GRASS PRODUCTS HAVING A METALLIC BACKING
Ronald W. Chidgey, Pensacola, and Jack Doleman, Gulf Breeze, Fla., assignors to Monsanto Chemical Company, St. Louis, Mo.
Filed Sept. 16, 1968, Ser. No. 760,084
Int. Cl. A41g 1/00; D04h 11/00
U.S. Cl. 161—21                              9 Claims

ABSTRACT OF THE DISCLOSURE

Molded, thermoplastic, three-dimensional synthetic sod is provided which comprises a matrix having openings, projections extending from the matrix to simulate blades of grass and an open mesh, metallic screen bonded to the under side of the matrix. The backing serves to provide dimensional stability to the sod against temperature changes. Additionally, the under side of the matrix may have a porous, fibrous, synthetic fabric bonded thereto through the openings in the metallic screen. The fabric serves to prevent weed growth and erosion.

BACKGROUND OF THE INVENTION

Figure 1:
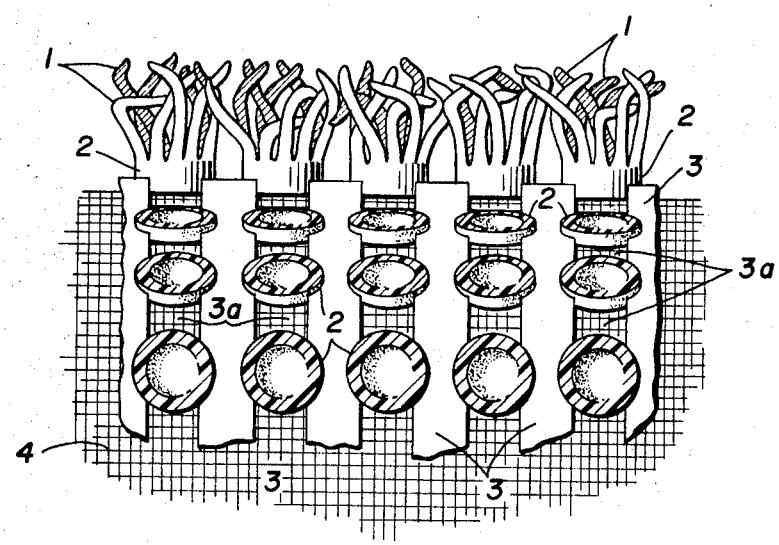

Molded, synthetic sod or grass has recently found some acceptance for use in place of natural grass in areas where grass is difficult to grow or maintain. In the copending application of Doleman and Hills, Ser. No. 650,986, filed July 3, 1967, now U.S. Pat. No. 3,507,010, there is disclosed and claimed a type of synthetic sod which is a continuously molded thermoplastic material comprising a matrix having projections therefrom. The matrix also contains openings for drainage, etc. French Pat. No. 1,314,933 discloses another but similar type of molded grass product which is produced in squares or blocks with means for connecting one to the other. U.S. Pat. 3,157,557 discloses yet another type of molded grass product made of synthetic thermoplastic material.

While synthetic, thermoplastic, molded grass products are relatively inexpensive and do have a certain aesthetic appeal certain difficulties have been encountered in their use. Since these synthetic grass products are made of thermoplastic materials, e.g. polyolefins, they possess the disadvantage of extremely poor dimensional stability, i.e., they tend to expand and contract in response to temperature changes. Obviously this is undesirable when, for example, the product is used as a lawn surface since contraction will leave openings at the seams and expansion will cause unsightly buckling.

SUMMARY OF THE INVENTION

In accordance with this invention these disadvantages are overcome by providing a three-dimensional, molded, grass-like product comprising a relatively flat thermoplastic matrix having projections extending therefrom and integral therewith. The projections are shaped to simulate natural grass and the matrix is provided with openings over its surface area. On the bottom side of the matrix, in accordance with this invention, there is provided an open mesh metallic screen which is bonded thereto.

The matrix and projections thereon are molded, as an integral unit, from a thermoplastic material. Because of its availability and performance qualities, polyethylene is preferred but other materials such as polypropylene, nylon, polyesters and like thermoplastic materials may be employed. Thermoplastic copolymers or blends are also satisfactory. The integrally molded matrix and projections may be produced by a batch process, i.e., one sheet at a time, or by a continuous process as described in said copending Ser. No. 650,986 filed July 3, 1967. Obviously, for economic reasons a continuous process is preferred. Regardless of how the integrally molded material is made it is necessary that the matrix be provided with openings for water drainage. In a batch, or piece-molding process this is accomplished by the usual method of shaping the mold so as to provide holes in the base or matrix. In the continuous process for molding three-dimensional materials described in said Ser. No. 650,986, openings in the matrix occur as a natural result of the process. In that process, the projections occur in clusters which clusters are connected by parallel strips of thermoplastic material. Since the clusters do not abut each other, the openings occur between the clusters. The projections which extend from the matrix are essentially vertical after being molded. In order to impart the appearance of natural grass it is necessary to texture the molded material to disperse the tips of the projections randomly, much in the manner of natural grass. This may be conveniently done by applying a heated pressure roll to the top of the molded material, i.e., the side from which the projections extend. If the thermoplastic material is hot enough, e.g., if it retains heat from the molding operation, the pressure roll need not be heated. This texturing imparts a permanent crimp in the projections whereby they remain flattened down with the tips dispersed randomly over the surface.

The important feature of this invention is the provision of an open mesh metallic screen bonded to the back of the matrix. As stated above, the use of such a metallic screen serves to impart dimensional stability to the artificial sod. Since the products of this invention find application in out-of-doors uses, it is desirable that the metal screen be one which has resistance to weathering. For this reason aluminum is preferred but other metals such as steel, stainless steel, iron, lead and other like metals may also be used.

The metal screen is preferably bonded to the thermoplastic matrix by heating the matrix, contacting the heated portion of the matrix with the screen and applying pressure, e.g., squeeze rolls, to firmly embed the screen into the matrix. This type of bonding, i.e., heat bonding, is preferred since no foreign substances are introduced into the product. However, other bonding methods, e.g., adhesive bonding, may be employed for those purposes in which the disadvantages are not objectionable.

While the bonding of the metal screen to the thermoplastic matrix serves to impart dimensional stability to the synthetic sod of this invention, it may also be found desirable to bond an additional backing onto the matrix. For example, since the screen is open mesh and since the matrix is provided with openings to permit drainage, there is a tendency for weeds to grow up through the openings. As described in our copending application Ser. No. 760,222 filed Sept. 17, 1968, and entitled "Molded Thermoplastic Artificial Sod Having a Fabric Backing," such weed growth can be retarded by bonding a synthetic, porous, fibrous backing onto the matrix. In accordance with the present invention it has been found that such a synthetic, porous, fibrous backing may readily be applied to the matrix in which the metal screen is already embedded or bonded. Since the metal screen is open mesh, there is a substantial area of uncovered thermoplastic to which the fibrous material may be bonded. Again, while other methods of bonding may be used, it is preferred that the synthetic, porous, fibrous backing be heat bonded to the matrix through the holes in the open mesh metallic screen. This bonding can even be done concurrently with the bonding of the metal screen. Thus, the metal screen can be contacted to the matrix with the synthetic fabric on top of the metal screen, the matrix is heated and the entire assembly passed through pressure rolls. Such bonding has been found very satisfactory.

Figure 2:
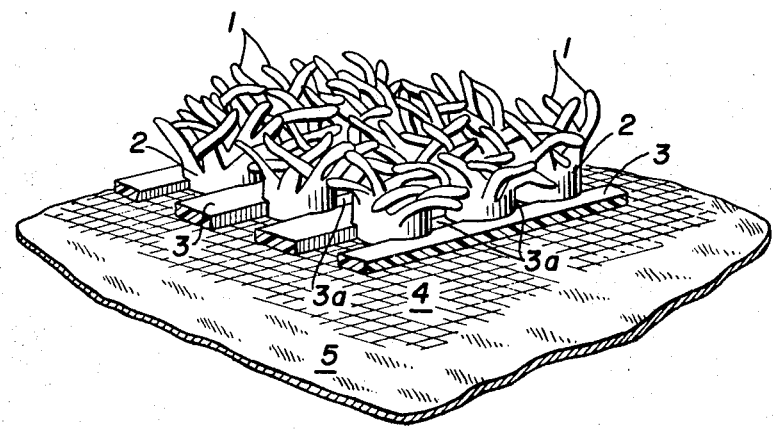

The invention may be readily understood from the accompanying drawings wherein FIG. 1 shows an illustrative cut-away view of the product of the invention. For purposes of illustration, the product is shown in a bent or roll position. The product comprises thermoplastic blades 1, which are preferably bent or crimped to simulate natural grass. The blades are shown in clusters having a base 2. The clusters form an integral part of the synthetic sod and are arranged between parallel strips 3 composed, preferably, of the same thermoplastic material. The matrix has openings 3a between the clusters. Metallic screen 4 is shown bonded to the underside of the matrix. FIG. 2 is a view of an additional embodiment of the invention and shows a porous fibrous fabric 5 bonded to the matrix through the openings in the metallic screen.

PREFERRED EMBODIMENTS

Example I

This example illustrates a preferred method of producing synthetic molded sod with a metallic screen bonded to its lower surface by means of a continuous process. The apparatus used to mold the synthetic grass of this example is fully described in U.S. patent application 650,986, filed July 3, 1967, now U.S. Pat. 3,507,010, and is shown in FIGS. 1, 15 and 16 of said patent.

Using a blend of 100 parts by weight of polyethylene, Melt Index 22, and 4 parts (wt.) of green pigmented polyethylene (90% polyethylene, 10% green pigment) a continuous length of 36" wide artificial sod with an aluminum wire screen backing was produced.

The molten polymer was forced through a distributing nozzle to a rotating mold drum with a 4½" diameter screw extruder. Melt temperature measured at the extruder exit was 425° F., nozzle temperature was 350° F., mold drum temperature was 125° F. Extrusion pressure was about 1350 p.s.i. at the end of the extruder barrel. At the deepest part of the mold cavity, which was at the blade tips, pressure was about 1100 p.s.i. At the entrance of the mold cavity pressure was about 50 p.s.i. The total force holding the rotating drum in contact with the nozzle was about 9000 lbs. Peripheral speed of the drum was about 4 f.p.m. Before the molded product is cooled, a 36" width of 8 x 8 woven aluminum wire screen is fed to the flat surface of the molded synthetic sod from a supply roll above the apparatus. The linear feed rate of the screen is about equal to the peripheral speed of the drum and is controlled by drum speed. While the screen is fed from the supply roll it is held under tension by a tension gate; it then travels under a pressure roll which imbeds the screen into the curvilinear surface of the molded grass. The pressure roll is held against the surface of the product by a force of about 600 lbs. at the point of contact. Simultaneously external heat is applied to the molded product before it makes contact with the screen. This is done to maintain the polymer surface in a semi-molten state and thereby allow the screen to be imbedded into the matrix and effect a perfect bond between screen and molded product. The external heat that is supplied to the polymer immediately following injection molding is preferably radiant heat. In this example, one 2,000 watt infra-red lamp, placed about 1 to 2 inches above the mold drum, is sufficient to maintain the polymer surface in a molten state satisfactory for fabric bonding. During processing the synthetic grass product is cooled by feeding water at about 70° F. to the interior of the drum at a rate of about 35 gals./min. As the molded grass is cooled to about 175° F., it is stripped from the drum and textured by passing it under a pair of heated metal rolls and wound on a mandrel to form large rolls of synthetic grass suitable for future handling and storage.

Example II

The procedure described in Example I was repeated with the exception that a 36" width of non-woven polyester (1–2 oz./yd.$^2$) is fed to the flat surface of the molded sod on top of the aluminum screen from a supply roll. The feed rate of the fabric is about equal to the feed rate of the screen. When the sod, screen and fabric are passed under the pressure roll, the fabric is imbedded into the surface of the matrix between the holes in the screen, thus forming a bond. The subsequent processing and stripping of the sod off the mold is as described in Example I.

What is claimed is:
1. A three-dimensional, molded product comprising
    (a) a thermoplastic matrix having projections extending therefrom on the upper side thereof, said projections being shaped to simulate natural grass, said matrix having openings dispersed over its surface area; and
    (b) an open-mesh metallic screen bonded to the under side of said matrix.
2. The product of claim 1 wherein the screen is heat bonded to the matrix.
3. The product of claim 1 wherein the thermoplastic is a polyolefin.
4. The product of claim 3 wherein the polyolefin is polyethylene.
5. The product of claim 3 wherein the screen comprises aluminum wire.
6. The product of claim 1 wherein the projections are in the form of clusters.
7. The product of claim 6 wherein the matrix and projections are integral, with the projections being connected by parallel strips of thermoplastic material.
8. The product of claim 1 comprising additionally a thin synthetic, fibrous, porous fabric bonded to the under side of the matrix through the openings in the screen.
9. The product of claim 8 wherein the fabric is a non-woven polyester sheet.

References Cited

UNITED STATES PATENTS

| | | | |
|---|---|---|---|
| 3,157,557 | 11/1964 | Palmer | 161—67X |
| 3,390,044 | 6/1968 | Malakoff | 161—62X |
| 2,515,847 | 7/1950 | Winkler | 161—112X |
| 2,691,814 | 10/1954 | Tait | 264—249X |

PHILIP DIER, Primary Examiner

U.S. Cl. X.R.

161—67, 88, 115, 216, 214; 264—249